United States Patent
Lee et al.

(10) Patent No.: US 8,351,410 B2
(45) Date of Patent: Jan. 8, 2013

(54) METHOD AND APPARATUS FOR RECEIVING BROADCASTING SERVICE INFORMATION IN A DIGITAL BROADCASTING SYSTEM

(75) Inventors: Jae-Hong Lee, Seoul (KR); Seok-Min Hwang, Seoul (KR)

(73) Assignee: Samsung Electronics Co., Ltd (KR)

( * ) Notice: Subject to any disclaimer, the term of this patent is extended or adjusted under 35 U.S.C. 154(b) by 1010 days.

(21) Appl. No.: 11/705,996

(22) Filed: Feb. 14, 2007

(65) Prior Publication Data

US 2007/0220584 A1    Sep. 20, 2007

(30) Foreign Application Priority Data

Feb. 14, 2006    (KR) .................. 10-2006-0014180

(51) Int. Cl.
   *H04W 84/08* (2009.01)
(52) U.S. Cl. .................. 370/340; 725/136; 375/240.25; 348/469
(58) Field of Classification Search .................. 370/340, 370/331; 725/136, 118, 135, 105; 375/469, 375/240.25; 348/469
   See application file for complete search history.

(56) References Cited

U.S. PATENT DOCUMENTS

| | | | | |
|---|---|---|---|---|
| 6,477,185 B1 * | 11/2002 | Komi et al. | .................. | 370/536 |
| 7,724,682 B2 * | 5/2010 | Kovacevic | .................. | 370/252 |
| 2002/0067744 A1 | 6/2002 | Fujii et al. | | |
| 2003/0234890 A1 * | 12/2003 | Bae et al. | .................. | 348/469 |
| 2004/0264929 A1 * | 12/2004 | Lee et al. | .................. | 386/95 |
| 2005/0025459 A1 * | 2/2005 | Kato et al. | .................. | 386/95 |
| 2005/0069289 A1 * | 3/2005 | Kusunoki | .................. | 386/52 |
| 2006/0026644 A1 * | 2/2006 | Yamagishi | .................. | 725/46 |
| 2006/0048183 A1 * | 3/2006 | Choe | .................. | 725/39 |
| 2006/0104255 A1 * | 5/2006 | Kido et al. | .................. | 370/345 |
| 2007/0092241 A1 * | 4/2007 | Kikuchi et al. | .................. | 396/95 |
| 2007/0133497 A1 * | 6/2007 | Vare et al. | .................. | 370/345 |
| 2007/0232226 A1 * | 10/2007 | Kajitani | .................. | 455/7 |
| 2008/0282310 A1 * | 11/2008 | Koppelaar et al. | .................. | 725/118 |
| 2009/0080509 A1 * | 3/2009 | Itoh et al. | .................. | 375/240.01 |
| 2009/0300468 A1 * | 12/2009 | Pekonen | .................. | 714/776 |

FOREIGN PATENT DOCUMENTS

| | | |
|---|---|---|
| EP | 0 917 355 | 5/1999 |
| EP | 1 475 969 | 11/2004 |
| JP | 11-98098 | 8/1989 |
| JP | 2003-308643 | 10/2003 |
| WO | WO 97/46007 | 12/1997 |
| WO | WO 2006/003531 | 1/2006 |

OTHER PUBLICATIONS

"IP Datacast over DVB-H: PSI/SI", Sep. 2005.
"DVB-H System Description", Digital Video Broadcasting, Sep. 9, 2003.

* cited by examiner

*Primary Examiner* — Kamran Afshar
*Assistant Examiner* — Khawar Iqbal
(74) *Attorney, Agent, or Firm* — The Farrell Law Firm, P.C.

(57) ABSTRACT

Provided are an apparatus and a method for receiving PSI/SI in a DVB-H receiver, in which packets carrying PSI/SI are detected from TS packets received over a wireless network and counted, and the PSI/SI packets are read if the packet count number reaches a predetermined packet number.

7 Claims, 7 Drawing Sheets

METHOD AND APPARATUS FOR RECEIVING BROADCASTING SERVICE INFORMATION IN A DIGITAL BROADCASTING SYSTEM

PRIORITY

This application claims priority under 35 U.S.C. §119(a) to a Korean Patent Application filed in the Korean Intellectual Property Office on Feb. 14, 2006 and assigned Ser. No. 2006-14180, the entire contents of which are incorporated herein by reference.

BACKGROUND OF THE INVENTION

1. Field of the Invention

The present invention relates generally to an apparatus and method for receiving broadcasting service information in a digital broadcasting system, and in particular, to an apparatus and method for receiving Program Specific Information (PSI) and Service Information (SI) in a Digital Video Broadcasting-Handheld (DVB-H) receiver.

2. Description of the Related Art

Typically, broadcasting services target all users with broadcasting terminals. The broadcasting services are categorized into a audio broadcasting service that broadcasts voice only, such as radio broadcasting, video-focused broadcasting service like TV broadcasting, and a multimedia broadcasting service that includes audio, video and data. Starting with analog, these broadcasting services are moving to digital transmission owing to drastic technological development. Provisioning of the broadcasting services has evolved from transmission from transmitting towers to transmission of high-image quality, high-speed multimedia data via cable over a wired network, by satellites, or in both.

One of such broadcasting technologies is Digital Multimedia Broadcasting (DMB) that has fully entered a commercialization stage. Springing from Digital Audio Broadcasting (DAB), DMB is based on the European Research Coordination Agency project (Eureka)-147 standard of DAB.

The source of the DAB technology, Europe has organized a standard-specifying body called DVB and is working on standardization of mobile broadcasting under the name "DVB-H". DVB-H is a new standard that the European digital TV broadcasting standardization group DAB is developing after DVB-Satellite (DVB-S), DVB-Cable (DVB-C), and DVB-Terrestrial (DVB-T).

The DVB group, which previously focused on the development of DVB-eXtension (DVB-X), shifted gears in search of a new broadcasting paradigm DVB-H that makes the concept of mobile broadcasting apparent, considering that $3^{rd}$ Generation (3G) mobile communication technologies such as Universal Mobile Telecommunication System (UMTS) and International Mobile Telecommunication-2000 (IMT-2000), terrestrial digital TV, and DAB have limitations in providing a large volume of multimedia contents such as movies and broadcasting programs through mobile terminals.

DVB-H is a standard that enforces mobility to the European digital TV transmission standard, DVB-T. It is an extension from DVB-T, which supports low power, mobility, and portability in mobile terminals or portable image devices. Therefore, most of DVB-H physical layer standards were borrowed from DVB-T standards, except for several additional functionalities for portable/mobile reception.

A DVB-H system supports additional error correction coding for Layer 3 Internet Protocol (IP) packets. This is called Multi-Protocol Encapsulation-Forward Error Correction (MPE-FEC).

In the DVB-H system, broadcasting data are created in the form of IP datagrams. The IP datagrams are constructed to an MPE-FEC frame through Reed-Solomon (R-S) coding. Therefore, the MPE-FEC frame is divided into an MPE section with the IP datagrams and an MPE-FEC section with parity data generated from the R-S coding. The MPE and MPE-FEC sections are sent in a payload of a Transport Stream (TS) packet from a physical layer. The TS packet is a DVB-H transmission unit.

The above-described digital broadcasting system uses Motion Picture Experts Group (MPEG-2) TS.

The MPEG-2 TS system multiplexes audio and video data of broadcasting programs to 188-byte TS packets and gives a Packet IDentifier (PID) to the audio/video data of each broadcasting program. Upon receipt of the TS packets, a terminal identifies audio/video data by a PID and separates the audio/video data from the TS packets by filtering and demultiplexing. To allow the terminal to know the PIDs of audio/video data of the programs, information is sent to the terminal in the TS. A Program Map Table (PMT) lists the PIDs of audio/video data of the broadcasting programs. Since the PMT is also delivered in a TS packet, a PID identifies it. This PMT PID is known from a Program Association Table (PAT).

To view digital broadcasting services including DMB, the terminal acquires the PMT PIDs of broadcasting programs from an initial PAT. When the user of the terminal selects a broadcasting program, the terminal acquires a PMT by the PMT PID of the broadcasting program. The PMT includes the PID of audio/video TS packets of the selected broadcasting program. The PAT, PMT, and other information form PSI, which is defined as a part of the MPEG-2 TS system.

Aside from the PSI, information about the broadcasting programs is delivered in SI. Major SI information is an Electronic Program Guide (EPG). The EPG is carried in packets, Event Information Table (EIT), Service Description Table (SDT), and Time Offset Table (TOT).

In the present invention, both the PSI and the SI are called broadcasting service information.

Existing digital broadcasting systems including DMB regulate that the PSI and the SI are delivered in TS packets and have their own PIDs. The terminal acquires the PSI and the SI from received TS packets using the PIDs.

As stated above, major information delivered in PSI and SI packets is an EPG In other words, channel information is sent in the PSI and the SI. Hence, a terminal in the conventional digital broadcasting systems acquires the EPG from the PSI and SI.

However, since the DVB-H system adopts a transmission scheme of sending the EPG in IP datagrams, the DVB-H receiver does not need to receive the EIT, SDT and TOT of the PSI and SI. Conventionally, a broadcasting terminal is supposed to receive all PSI and SI packets and generate an interrupt signal to send the PSI and SI packets to a host. Consequently, the reception of unnecessary PSI and SI packets causes overhead.

That is, upon receipt of a predetermined number of TSs, a hardware logic sends them to the host without filtering of a PSI/SI PID, generating an interrupt signal. The host stores a large number of (hundreds to thousands of) packets in frames in a large-capacity system memory and returns selected packets with a PSI/SI PID to an application processor. While a hardware logic memory may have a small capacity, the capacity requirement of the system memory of the host increases.

Moreover, unnecessary PSI/SI packets are sent to the host. Hence, frequent interrupt generation and filtering increase overhead.

Accordingly, there exists a need for a technique for reducing the overhead and efficiently sending PSI/SI to the host. However, no techniques associated with transmission of PSI/SI from the DVB-H receiver to the host have been specified yet.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide an apparatus and method for receiving broadcasting service information in a digital broadcasting receiver.

Another aspect of exemplary embodiments of the present invention is to provide an apparatus and method for selecting packets carrying intended broadcasting service information and efficiently sending the selected packets in a digital broadcasting receiver.

A further aspect of exemplary embodiments of the present invention is to provide an apparatus and method for controlling a memory for storing broadcasting service information and sending an interrupt signal to a memory controller so that the memory controller can read the broadcasting services information from the memory in a digital broadcasting receiver.

Still another aspect of exemplary embodiments of the present invention is to provide an apparatus and method for selecting intended PSI/SI packets, and efficiently controlling a memory and processing an interrupt signal regarding the selected PSI/SI packets in a digital broadcasting receiver.

Yet another aspect of exemplary embodiments of the present invention is to provide an apparatus and method for reducing additional operations resulting from exchange of unnecessary information, reducing the overhead of a host by optimized information transmission, saving power, and reducing a receiver size by optimizing the use of a memory in a digital broadcasting receiver.

In accordance with an aspect of exemplary embodiments of the present invention, there is provided a method for receiving broadcasting service information in a digital broadcasting system, in which packets carrying broadcasting service information being PSI/SI are detected from TS packets received over a wireless network, the number of the detected PSI/SI packets is counted, and if the packet count reaches a predetermined packet number, the PSI/SI packets are read.

In accordance with another aspect of exemplary embodiments of the present invention, there is provided an apparatus for receiving broadcasting service information in a digital broadcasting system, in which a PID filter detects packets carrying broadcasting service information being PSI/SI with a PID identical to a preset PID from received TS packets, a packet counter counts the number of the detected PSI/SI packets, and a controller sets the PID for filtering regarding the TS packets and reads the PSI/SI packets, if the packet count reaches a predetermined packet number.

BRIEF DESCRIPTION OF THE DRAWINGS

The above and other objects, features and advantages of certain exemplary embodiments of the present invention will become more apparent from the following detailed description when taken in conjunction with the accompanying drawings, in which.

DETAILED DESCRIPTION OF EXEMPLARY EMBODIMENTS

Figure 1:
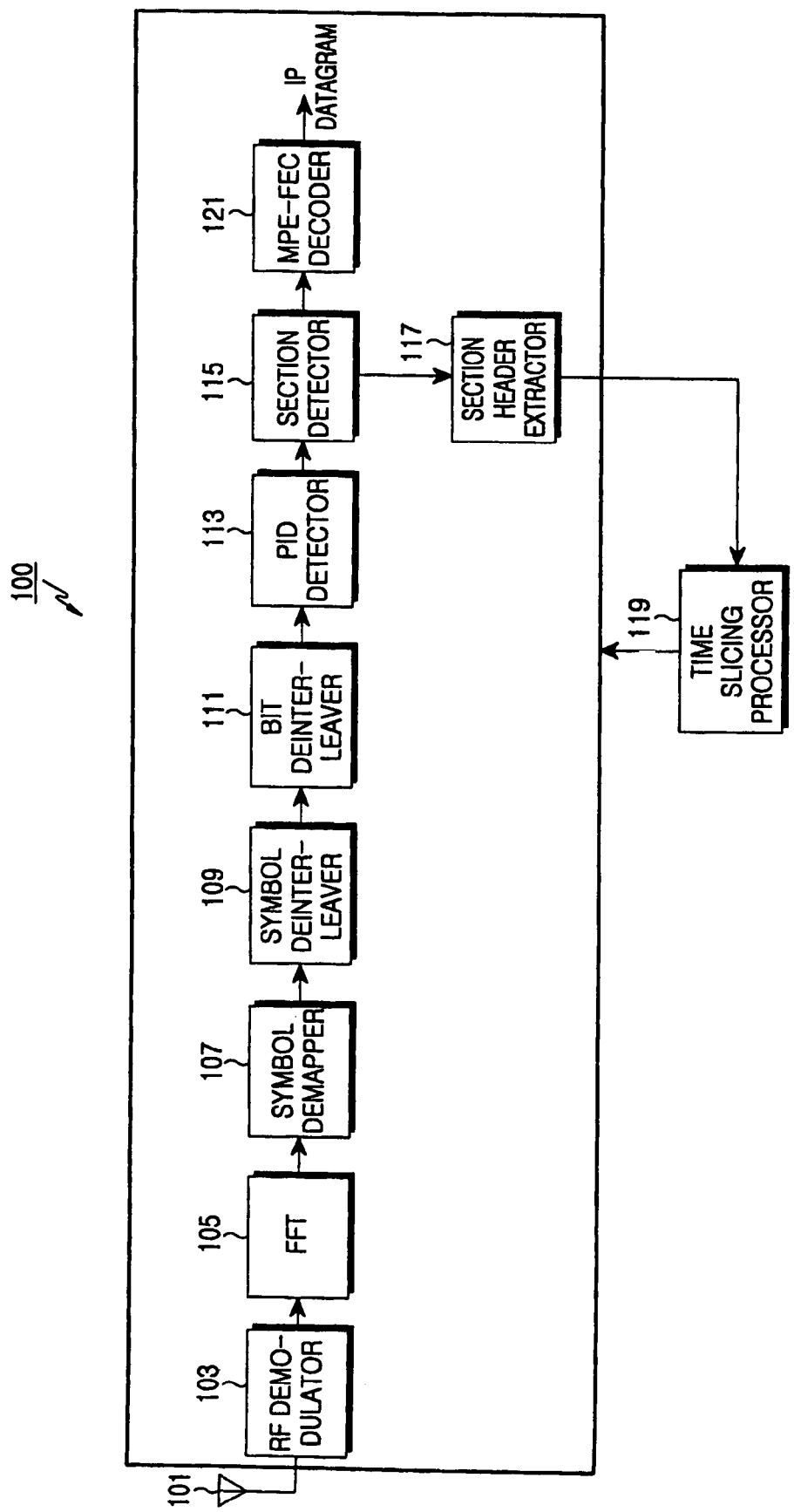
FIG. 1 is a block diagram illustrating a Digital Video Broadcasting-Handheld (DVB-H) receiver in a DVB-H system according to an exemplary embodiment of the present invention.

The matters defined in the description such as a detailed construction and elements are provided to assist in a comprehensive understanding of exemplary embodiments of the invention. In the drawings, the same or similar elements, features and structures are denoted by the same reference numerals even though they are depicted in different drawings. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

FIG. 1 is a block diagram illustrating a DVB-H receiver 100 in a DVB-H system according to an exemplary embodiment of the present invention.

Referring to FIG. 1, a Radio Frequency (RF) demodulator 103 down-converts a TS packet received through an antenna 101 over a wireless network and converts the down-converted TS packet to a digital signal. A Fast Fourier Transform (FFT) processor 105 converts the Orthogonal Frequency Division Multiplexing (OFDM) symbols of the digital signal to frequency signals. A symbol demapper 107 demaps the frequency signals in accordance with a predetermined modulation scheme such as Quadrature Phase Shift Keying (QPSK), 16-ary Quadrature Amplitude Modulation (16QAM), or 64-ary QAM (64QAM). A symbol deinterleaver 109 and a bit deinterleaver 111 deinterleave the mapped signals on a symbol basis and on a bit basis, respectively, thereby recovering the original signal.

A PID detector 113 performs a PID filtering. After the filtering, if a PID extracted from the header of the TS packet identifies a packet carrying an MPE or MPE-FEC section, the PID detector 113 determines that the MPE or MPE-FEC section has been received. If the PID identifies a PSI/SI, the PID detector 113 determines that the PSI/SI has been received. The operation of the PID detector 113 will be detailed later with reference to FIG. 2.

Each time a Table ID is detected from an MPE packet filtered in the PID detector 113 to be sent in the form of an IP datagram (where each section has a Table ID. For Application Data Table, the Table ID is "0x3e". For RS Data Table, the Table ID is "0x78"), a section detector 115 performs a Cyclic Redundancy Check (CRC) check and provides a section that has turned out good in the CRC check to an MPE-FEC decoder 121. At the same time, the section detector 115 notifies a section header extractor 117 of the CRC check result.

The section header extractor 117 performs a CRC check on the received section. If the section is successful in the CRC check, the section header extractor 117 acquires service information for broadcasting reception, for example, information about time slicing and the existence or absence of an MPE-FEC section from the header of the section. Especially the section header extractor 117 extracts Delta-t information from an MPE section or an MPE-FEC section and provides it to a time slicing processor 119 according to an exemplary embodiment of the present invention.

The time slicing processor 119 switches the receiver 100 such that the receiver 100 can receive a TS packet including an MPE-FEC frame or a TS packet including an MPE frame only in every predetermined burst period. That is, the time slicing processor 119 activates the receiver 100 only during a burst period and switches off the receiver 100 during an off-time period. The burst period is known from Delta-t information indicating the start of the next burst in the header of each MPE/MPE-FEC section. The section header extractor 117 extracts the delta-t information.

The MPE-FEC decoder 121 performs an R-S decoding on a received MPE-FEC frame row by row and provides a recovered IP datagram to a higher layer after error correction. Specifically, the MPE-FEC decoder 121 separates the IP datagram of an MPE section and parity data of an MPE-FEC section in the MPE-FEC frame, stores them respectively in an application data table region and an R-S data table region of an internal buffer, performs an R-S decoding, and recovers the original broadcasting data.

Figure 2:
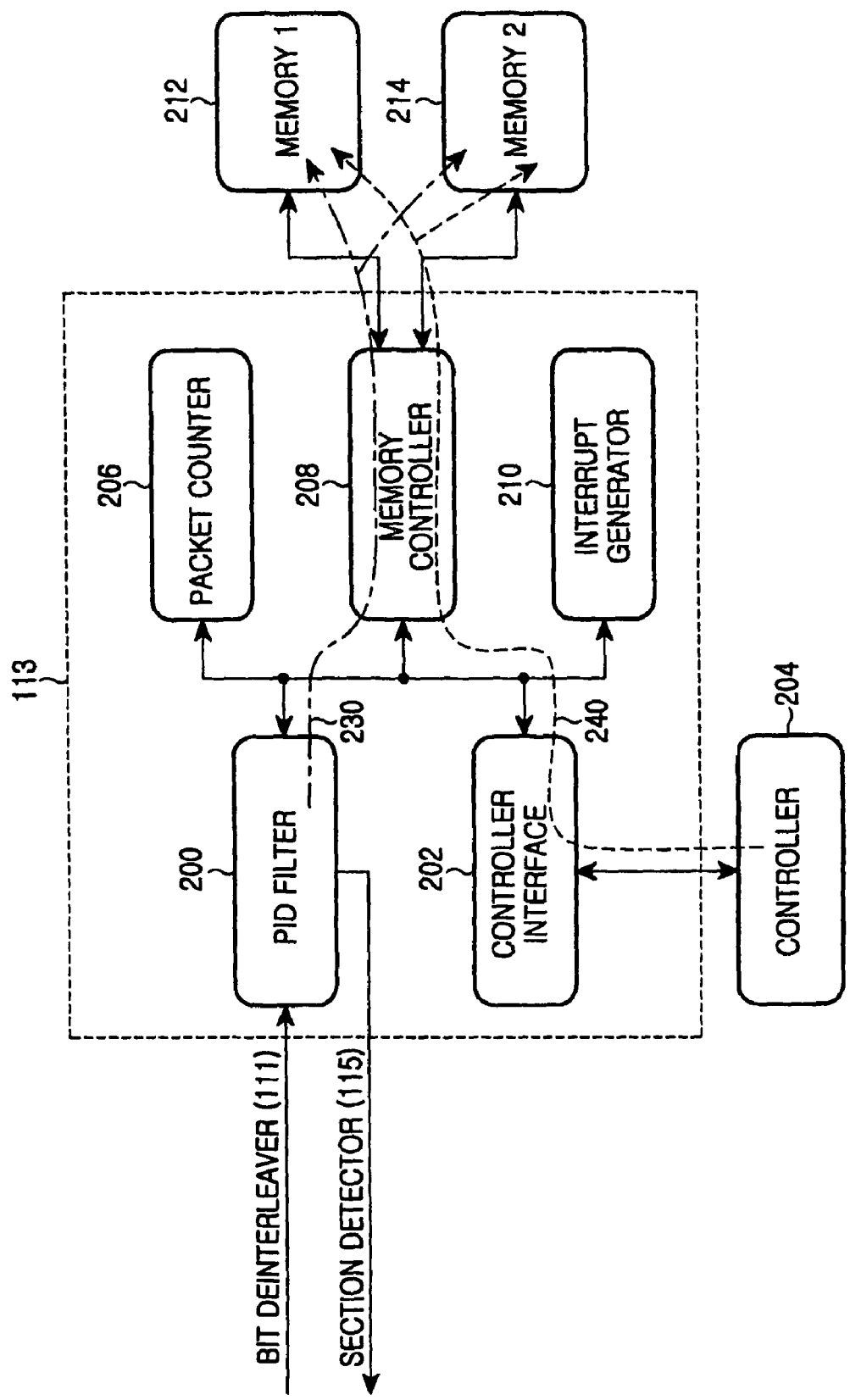
FIG. 2 is a block diagram illustrating a Packet IDentifier (PID) detector for receiving Program Specific Information (PSI)/Service Information (SI) (PSI/SI) packets from a transmitter in the DVB-H receiver according to an exemplary embodiment of the present invention.

FIG. 2 is a block diagram illustrating the PID detector 113 for receiving PSI/SI packets from a transmitter in the DVB-H receiver 100 according to an exemplary embodiment of the present invention.

Referring to FIG. 2, a PID filter 200 performs a PID filtering on the header of a TS packet received from the bit deinterleaver 111 and compares the filtered PID with a PID set for digital broadcasting reception by a controller 204. If the PIDs are identical, the PID filter 200 finds a write-enabled memory 212 or 214 and writes the received PSI/SI packet data in the memory 212 or 214 through a memory controller 208. Then, a packet counter 206 increases the count of packets by a predetermined value, for example, 1 under the control of the PID filter 200. The PID filter 200 also provides a filtered IP datagram of the received TS packet to the section detector 115.

The memory controller 208 generates a write enable signal regarding the memory 212 and the memory 214 to the PID filter 200 and the controller 204. The PID filter 200 writes the filtered PSI/SI packet data in the write-enabled memory 212 or 214 according to the write enable signal. The controller 204 reads stored PSI/SI packet data from the memory other than the write-enabled memory, referring to the write enable signal. Thus, the memory controller 208 supports read/write interfacing between the PID filter 200 and the controller 204 and controls read-write or write-read switching in the memory 212 and the memory 214 every predetermined time period. The period is set depending on the interrupt processing performance of the controller 204 that reads the PSI/SI packet data.

If a burst has not been completely received during reading a PSI/SI packet from one of the memories 212 and 214 in the controller 204, the PID filter 200 monitors reception of a new packet and in the presence of a PSI/SI packet to be filtered, it stores the PSI/SI packet in the other memory under the control of the memory controller 208. When it is time to switch between read and write in the memories 212 and 214, an interrupt generator 210 checks the count of packets from the packet counter 206 and, if the count is greater than 0, that is, at least one filtered PSI/SI packet exists in the memories 212 and 214, provides an interrupt signal to the controller 204 so that the controller 204 can read the PSI/SI packet from a read-enabled memory. After sending the interrupt signal, the interrupt generator 210 initializes the packet counter 206.

A controller interface 202 supports interfacing of control signals and data between the controller 204 and the PID detector 200, the memory 212, and the memory 214.

The memories 212 and 214 are controlled such that when one of them is engaged in a writing operation, the other memory is read-enabled. For example, if the PID filter 200 writes in the memory 212, the controller 204 can read from the memory 214. Before filtered PSI/SI packet data is sent to the controller 204, these two memories 212 and 214 are used for buffering the PSI/SI packet data.

The controller 204 may be a Central Processing Unit (CPU) or an application processor. Upon receipt of the interrupt signal from the interrupt generator 210, the controller 204 reads PSI/SI packet data from a read-enabled memory. It also sends a packet PID for filtering to the PID filter 200.

Reference numeral 230 denotes a path for the PID filter 200 to write filtered PSI/SI packet data in the memory 212 or 214 and reference numeral 240 denotes a path for the controller 204 to read the filtered PSI/SI packet data in the memory 212 or 214.

The operations of the controller 204, the interrupt generator 210, and the memories 212 and 214 will be described in great detail below with reference to the timing diagram of FIG. 4.

Figure 3:
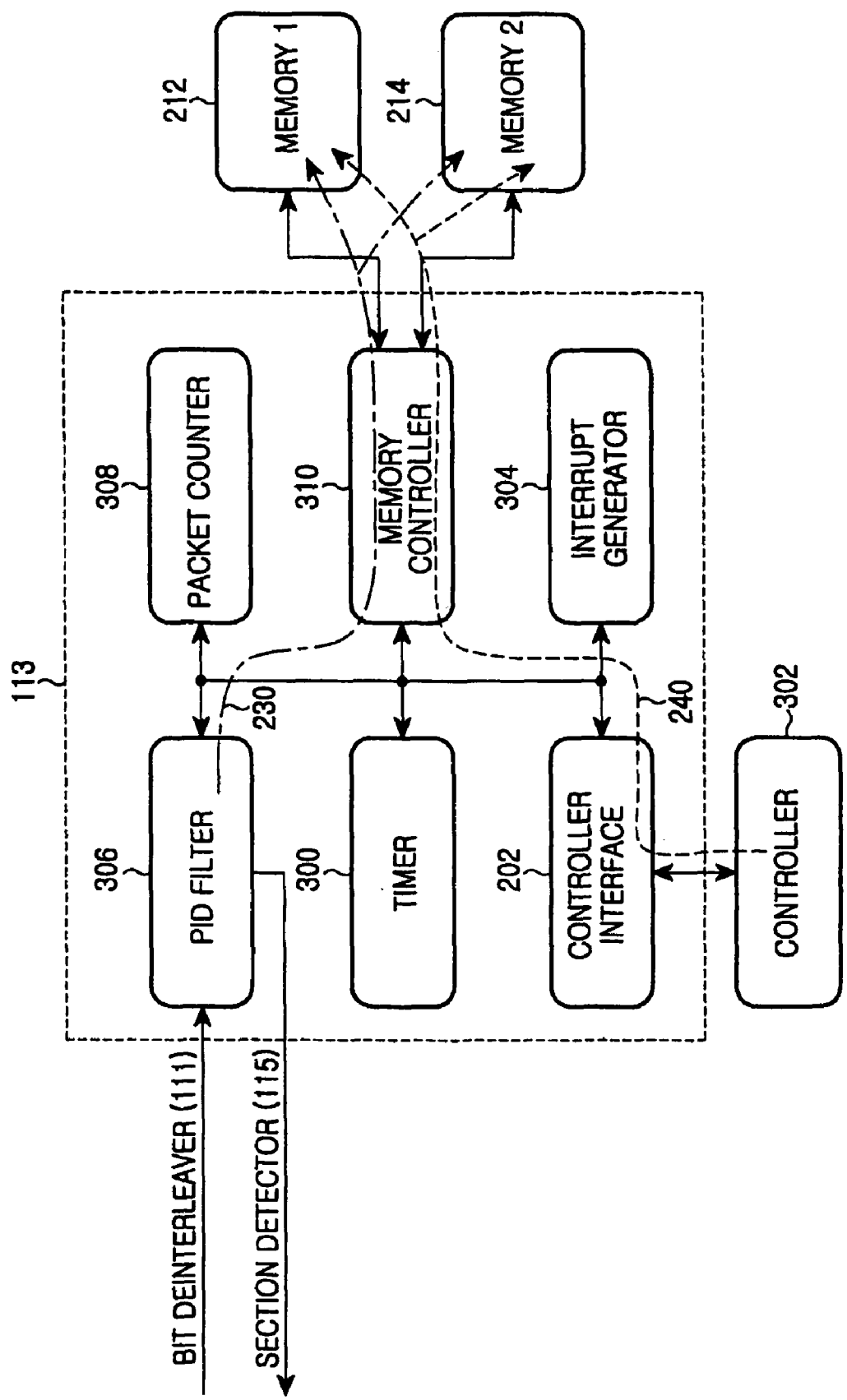
FIG. 3 is a block diagram illustrating a PID detector for receiving PSI/SI packets from a transmitter in the DVB-H receiver according to another exemplary embodiment of the present invention.

FIG. 3 is a block diagram illustrating the PID detector 113 for receiving PSI/SI packets from the transmitter in the DVB-H receiver according to another exemplary embodiment of the present invention.

The PID detector 113 illustrated in FIG. 3 additionally has a timer 300, compared to the PID detector 113 illustrated in FIG. 2.

While the PID detector 113 is embodied differently herein, it can be configured to support the two embodiments simultaneously. In this case, the PID detector 113 always has the timer 300.

Since like reference numerals denote the same blocks in FIGS. 2 and 3, blocks that perform different functions compared to their counterparts illustrated in FIG. 2 and the new block, the timer 300 are focused on in the following description.

Referring to FIG. 3, a controller 302 notifies the PID filter 200 of a packet PID before PID filtering, like the controller 204 of FIG. 2. The PID is a 13-bit ID that the transmitter attaches to the header of a TS packet to indicate the usage of the TS packet. The controller 302 provides a maximum packet number and a maximum timer value to a packet counter 308 and the timer 300, respectively. Compared to the controller 204 of FIG. 2, the controller 302 additionally sets the maximum packet number and the maximum timer value.

If the number of packets counted by the packet counter 308 reaches the maximum packet number or a time counted by the timer 300 reaches the maximum timer value, an interrupt generator 304 outputs an interrupt signal to the controller 302, thereby providing a read timing. Also, if the time count reaches the maximum timer value or the packet count reaches the maximum packet number, the interrupt generator 304 initializes the timer 300 and provides an interrupt signal to the controller 302. Also, if the time count reaches the maximum timer value and the packet count is greater than 0, the interrupt generator 304 initializes the packet counter 308 and provides an interrupt signal to the controller 302.

Upon receipt of a TS packet, a PID filter 306 compares the controller-set PID with a PID extracted from the header of the TS packet. If the PIDs are different, the PID filter 306 awaits reception of the next TS packet. If the PIDs are identical, the PID filter 306 finds a write-enabled memory 212 or 214 and writes PSI/SI packet data of the TS packet in the write-enabled memory 212 or 214. Simultaneously, the PID filter 306 controls the packet counter 308 to increase the packet count by 1.

In accordance with this embodiment of the present invention, a write-read or read-write switching occurs according to two factors: the maximum packet number and the maximum timer value. If the count of packets filtered by the PID filter 306 reaches the maximum packet number, or if the time count of the timer 306 reaches the maximum timer value even though no PSI/SI packets to be filtered have been received during a time period equal to the maximum timer value counted from reception of the first PSI/SI packet to be filtered after completion of a writing operation in one memory, a memory controller 310 switches the memories 212 and 214 between read and write.

The timer 300 and the packet counter 308 start to count under the control of the PID filter 306 and are initialized by the interrupt generator 304.

The memory controller 310 provides data paths between the PID filter 306 and the memories 212 and 214 as well as between the controller 302 and the memories 212 and 214. It also generates a write enable signal by which the operation modes of the memories 212 and 214 are switched. Each time the interrupt generator 304 generates an interrupt signal, the memory operation modes are switched.

Figure 4:
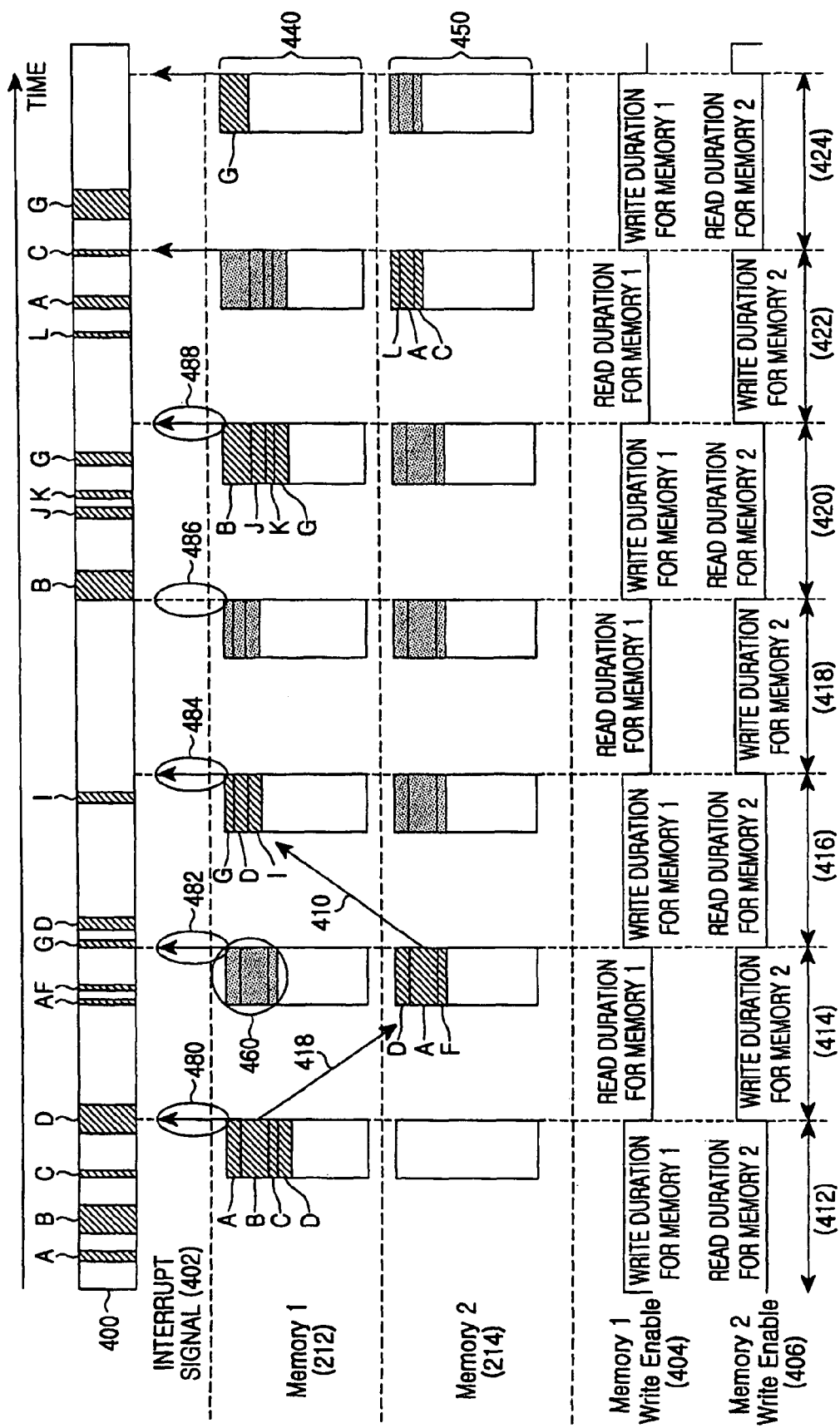
FIG. 4 is a timing diagram for a controller to read PSI/SI packets according to an exemplary embodiment of the present invention.

FIG. 4 is a timing diagram for the controller 204 to read PSI/SI packets according to an exemplary embodiment of the present invention. Writing and reading alternate between the two memories 212 and 214 every predetermined time period, for sending received PSI/SI packets to the controller 204. In the absence of any received PSI/SI packets during the time period, PSI/SI packet transmission to the controller 204 does not occur.

Referring to FIG. 4, reference numeral 400 denotes a timing at which packets of a PID filtered by the PID filter 200 are stored in the memories 212 and 214 over time. Reference numeral 402 denotes a timing at which the interrupt generator 210 provides an interrupt signal to the controller 204 when a packet count of the packet counter 206 is greater than 0 at a memory operation switching time. Reference numerals 440 and 450 denote the states of the memories 212 and 214 according to the writing of the PID filter 200 and the reading of the controller 204, respectively.

Reference numeral 404 denotes a period in which the memory controller 208 generates a write enable signal indicating that the memory 212 is write-enabled, and reference numeral 406 denotes a period in which the memory controller 208 generates a write enable signal indicating that the memory 214 is write-enabled.

Reference numerals 412, 416, 420 and 424 denote time periods in which the PID filter 200 can read in the memory 212, and reference numerals 414, 418 and 422 denote time periods in which the PID filter 200 can write in the memory 214.

During the period 412, PSI/SI packets A, B and C with the PID preset by the controller 204, and a first half of a PSI/SI packet D with the PID are written in the memory 212. At the end of the period 412, i.e. at a memory operation switching time, an interrupt signal is generated at time 480 and thus the controller 204 reads the PIS/SI packets A, B, C and the first half of the PSI/SI packet D from the memory 212 in the period 414. The PID filter 200 writes the last half of the packet D and PSI/SI packets A and F in the memory 214 in the period 414. When the period 414 expires and the period 416 starts, i.e. when the memory 212 switches to a writing operation and the memory 214 switches to a reading operation, an interrupt signal is generated at time 482 and the controller 204 starts to read the PSI/SI packets from the memory 214. Portions marked as denoted by reference numeral 460 represent no PSI/SI packet writing in their time periods.

At time 480, the memory controller 208 switches the memory 212 from write to read and the memory 214 from read to write. During the period 416, the memory 212 is write-enabled again and the memory 214 is read-enabled. Thus, the PID filter 200 writes PSI/SI packets G, D and I and the controller 204 reads the PSI/SI packets D, A and F written in the period 414 from the memory 214.

At time 486 when the period 418 expires and the period 420 starts, an interrupt signal is not generated because the PID filter 200 writes no PSI/SI packets in the memory 214 during the period 418 and thus the packet count of the packet counter 206 is 0.

Thus, during the period 420, the controller 204 reads no PSI/SI packets from the memory 214.

During the periods 422 and 424, writing and reading occur in the same manner.

Figure 5:
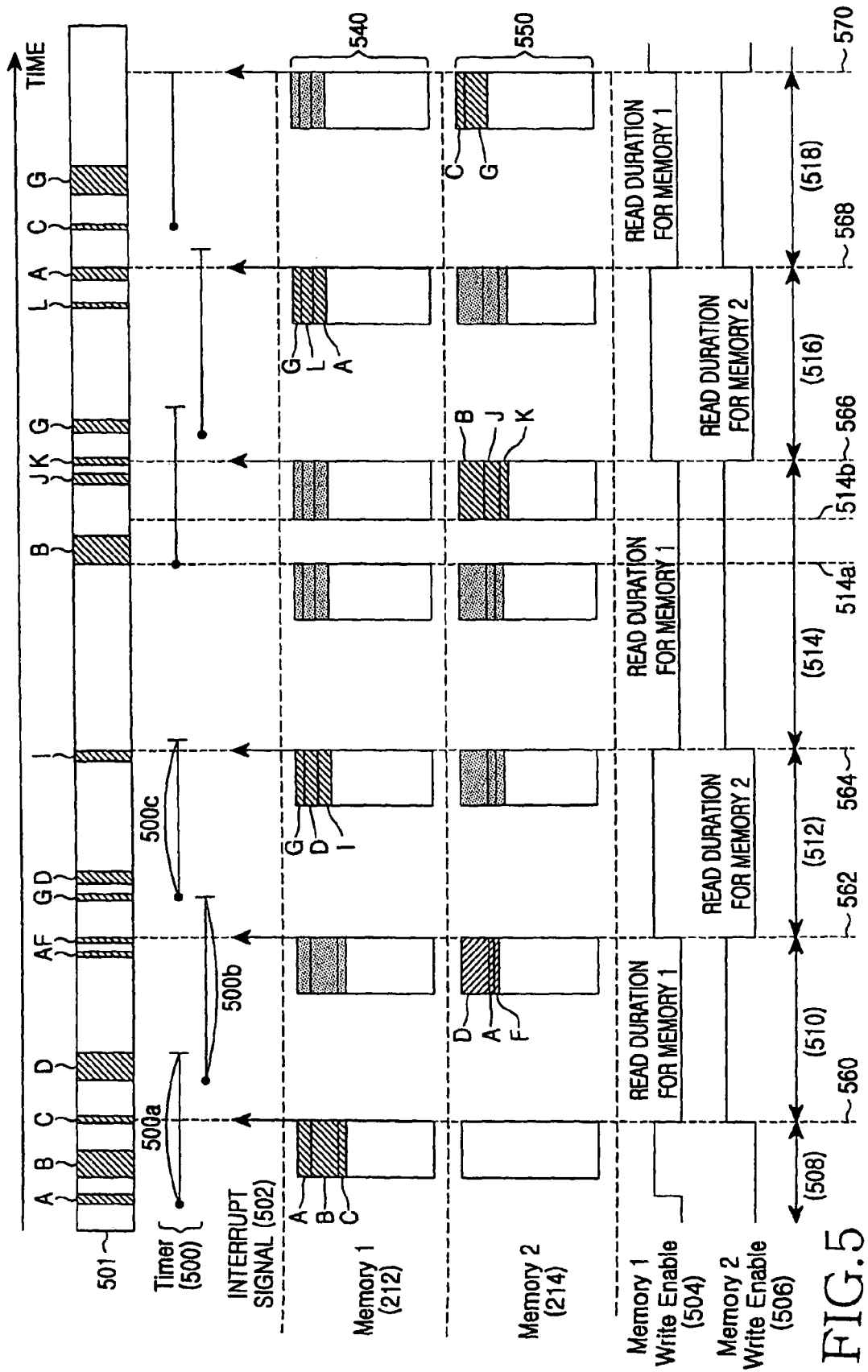
FIG. 5 is a timing diagram for the controller to read PSI/SI packets according to another exemplary embodiment of the present invention.

FIG. 5 is a timing diagram for the controller 302 to read PSI/SI packets according to another exemplary embodiment of the present invention.

Referring to FIG. 5, reference numeral 501 denotes a timing at which packets of a PID filtered by the PID filter 306 are stored in the memories 212 and 214 over time. As stated before, in accordance with the second exemplary embodiment, of the present invention, there are two interrupt signal generation conditions. One is that the packet count of the packet counter 308 is equal to the maximum packet number, and the other is that the time count of the timer 300 is equal to the maximum timer value. Compared to the first exemplary embodiment of the present invention, the operation modes of the memories 212 and 214 are switched when an interrupt signal is generated. In the illustrated case of FIG. 5, the maximum packet number is 3.

Reference numeral 500 denotes times at which the timer 300 reaches the maximum timer value and times at which the timer 300 are deactivated. Reference numeral 500a denotes a timer duration for which the timer 300 counts time until the maximum timer value, and reference numeral 500b denotes a timer duration for which the timer 300 counts time after initialization due to an interrupt signal generated at time 560. Reference numeral 500c denotes a timer duration for which the timer 300 counts time after initialization due to an interrupt signal generated at time 562.

During a period 508, the PID filter 306 writes filtered PSI/SI packets A, B and C in the memory 212. Thus, the packet counter 308 has reached the maximum packet number. At time 560, the interrupt generator 304 generates an interrupt signal and the memory controller 310 switches the operation modes of the memories 212 and 214. During a period 510, the memory 212 is read-enabled and the memory 214 is write-enabled. Both the timer counter 300 and the packet counter 308 are initialized to 0 at time 560 since the interrupt signal is generated.

During the period 510, the PID filter 306 writes filtered PSI/SI packets D, A and F in the memory 214 and the controller 302 reads the PSI/SI packets A, B and C from the memory 212. As the packet counter 308 counts three PSI/SI packets during the period 510, the interrupt generator 304 generates an interrupt signal at time 562. At the same time, the memory controller 310 switches the operation modes of the memories 212 and 214 and the interrupt generator 304 initializes the packet counter 308 and the timer counter 300.

During a period 512, the memory 212 is write-enabled and the memory 214 is read-enabled. Hence, the controller 302 reads the PSI/SI packets D, A and from the memory 214 and the PID filter writes PSI/SI packets G, D and I in the memory 212. As the packet count reaches the maximum packet number, the interrupt generator 304 generates an interrupt signal at time 564.

During a period 514, the memory 212 is read-enabled and the memory 214 is write-enabled. Thus, the controller 302 reads the PSI/SI packets G, D and I from the memory 212. During a time period from the start of the period 514 and to time 514a; the timer 300 is kept inactive. Therefore, the interrupt generator 304 does not generate an interrupt signal because the PID filter 306 has written no PSI/SI packets in the memory 214 and thus the controller 302 cannot read from the memory 214.

At time 514b, the PID filter 306 writes PSI/SI packets B, J and K in the memory 214. As the packet count reaches the maximum packet number, the interrupt generator 304 generates an interrupt signal at time 566. Hence, the memories 212 and 214 are switched in operation mode.

During a period 516, the memory 212 is write-enabled and the memory 214 is read-enabled. The controller 302 reads the stored PSI/SI packets B, J and K from the memory 214 and the PID filter 306 writes new PSI/SI packets G, L and A in the memory 212. As the packet count reaches the maximum packet number, the interrupt generator 304 generates an interrupt signal at time 568. Thus, the memory controller 310 switches the operation modes of the memories 212 and 214.

During a period 518, the memory 212 is read-enabled and the memory 214 is write-enabled. The controller 302 reads the stored PSI/SI packets G, L and A from the memory 212 and the PID filter 306 writes new PSI/SI packets C and G in the memory 214. Although the packet count is 2, which is short of the maximum packet number, the timer 300 expires at time 570. Therefore, the interrupt generator 340 generates an interrupt signal at time 570 because the packet count is greater than 0 and the time count has reached the maximum timer value.

The reason for setting the maximum packet number is to reduce the load that may be caused when the controller 202 receives an interrupt signal to process PSI/SI packet data on a packet basis and the interrupt generator 304 generates an interrupt signal for every packet. Even in this case, the interrupt generator 304 can send an interrupt signal to the controller 302 each time a PSI/SI packet is stored in a memory, if the maximum packet number is set to 1. The timer 300 is used for the purpose of preventing too delayed information reception in the controller 302, which otherwise might happen when it takes a long time to receive the maximum number of packets.

Until the timer 300 expires or until the packet count of the packet counter 308 reaches the maximum packet number, the PID filter 306 writes filtered packets in a memory and the packet counter 308 increases its packet count.

When the operation modes of the memories 212 and 214 are to be switched, the interrupt generator 304 initializes the timer 300 and compares the number of packets stored in a write-enabled memory with 0. If at least one filtered PSI/SI packet exists in the memory, the interrupt generator 304 initializes the packet counter 308. When the interrupt generator 304 generates an interrupt signal, the memory controller 310 switches the operation modes of the memories 212 and 214 and the interrupt signal is provided to the controller 302.

The controller 302 reads PSI/SI packets from a read-enabled memory. If a burst is still being received during the controller's reading a PSI/SI packet from the read-enabled memory, reception of a new PSI/SI packet is monitored and in the presence of a PSI/SI packet to be filtered, the PSI/SI packet is stored in the other write-enabled memory. That is, the second exemplary embodiment of the present invention is characterized in that a predetermined number of received PSI/SI packets are sent to the controller 302 each time.

In the two exemplary embodiments of the present invention illustrated in FIGS. 4 and 5, only the controller-designated PSI/SI packets are sent to the controller. This is made possible by filtering the PSI/SI packets through a hardware logic.

Figure 6:
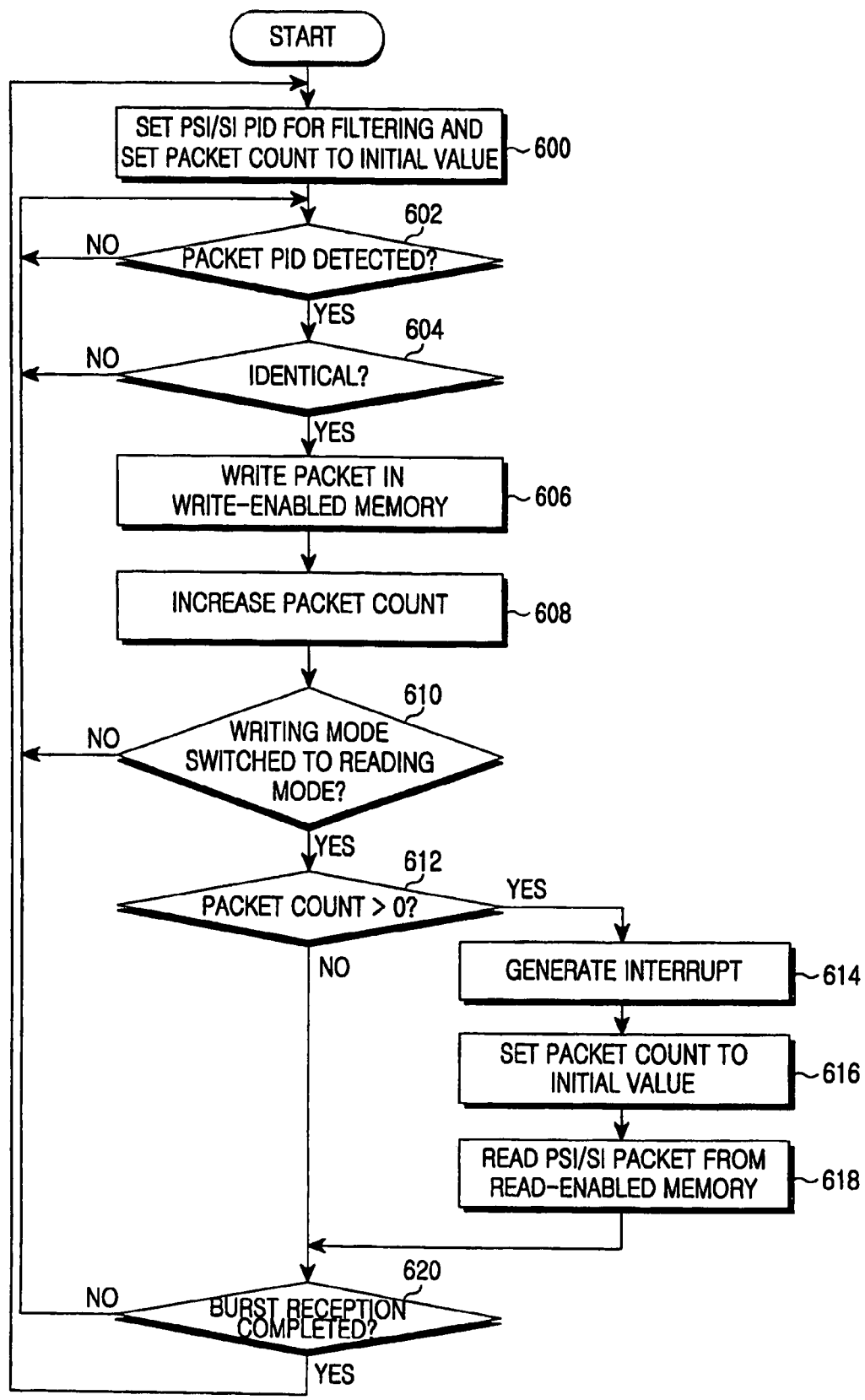
FIG. 6 is a flowchart illustrating an operation for receiving PSI/SI packets in the DVB-H receiver according to an exemplary embodiment of the present invention.

FIG. 6 is a flowchart illustrating an operation for receiving PSI/SI packets in the DVB-H receiver according to an exemplary embodiment of the present invention.

Referring to FIG. 6, the controller 204 sets an intended PSI/SI PID for filtering and sets a packet count to an initial value in step 600. In general, a TS packet may carry PSI/SI or data information corresponding to an MPE section or an MPE-FEC section. The type of data that the TS packet carries is known from its header. Hence, the controller 204 sets a PID that the PID filter 200 will filter.

In step 602, the PID filter 200 filters the received TS packets and checks whether the PID is detected. If the PID is detected, this implies that the PID of a received TS packet is identical to a PID identifying PSI/SI and thus the received TS packet is considered as a packet carrying PSI/SI.

The PID filter 200 compares the detected PID with the controller-set PID in step 604. If the PIDs are identical, the PID filter 200 writes PSI/SI packet data of the TS packet in a write-enabled memory in step 606 and controls the packet counter 206 to increase its packet count by 1 in step 608.

In step 610, the interrupt generator 210 determines whether the write-enabled memory has switched to a read operation mode. If the operation mode is switched, the packet count is compared with 0 in step 612. The reason for monitoring the operation mode switching between the memories 212 and 214 is to generate an interrupt signal. Step 612 is performed because if the packet count is greater than 0, this means that PSI/SI packet data to be read by the controller 204 exists in the memories 212 and 214.

If the packet count is greater than 0 in step 612, the interrupt generator 210 generates an interrupt signal in step 614 and sets the packet count of the packet counter 206 to an initial value in step 616. In step 618, the controller 204 reads the PSI/SI packet data from a read-enabled memory.

Alternatively, if the packet count is 0 in step 612, this implies the absence of any TS packet that is being received. Hence, the controller 204 determines whether the current burst reception has been completed in step 620. If the burst is being still received, the procedure returns to step 602 and the above operation is repeated. If the burst reception has been completed, the controller 204 sets a PID packet value to be filtered and sets the packet count to an initial value in step 600. The controller 204 can find out from a section detection result whether the burst reception has been completed.

If the burst reception is still going on in step 620 even during the controller's reading PSI/SI packet data from a memory, the PID filter 200 determines whether a new packet has been received. In the presence of PSI/SI packet data to be filtered, the PID filter 200 controls the memory controller 208 to write the PSI/SI packet data in the other memory than the current read-enabled memory.

Figure 7:
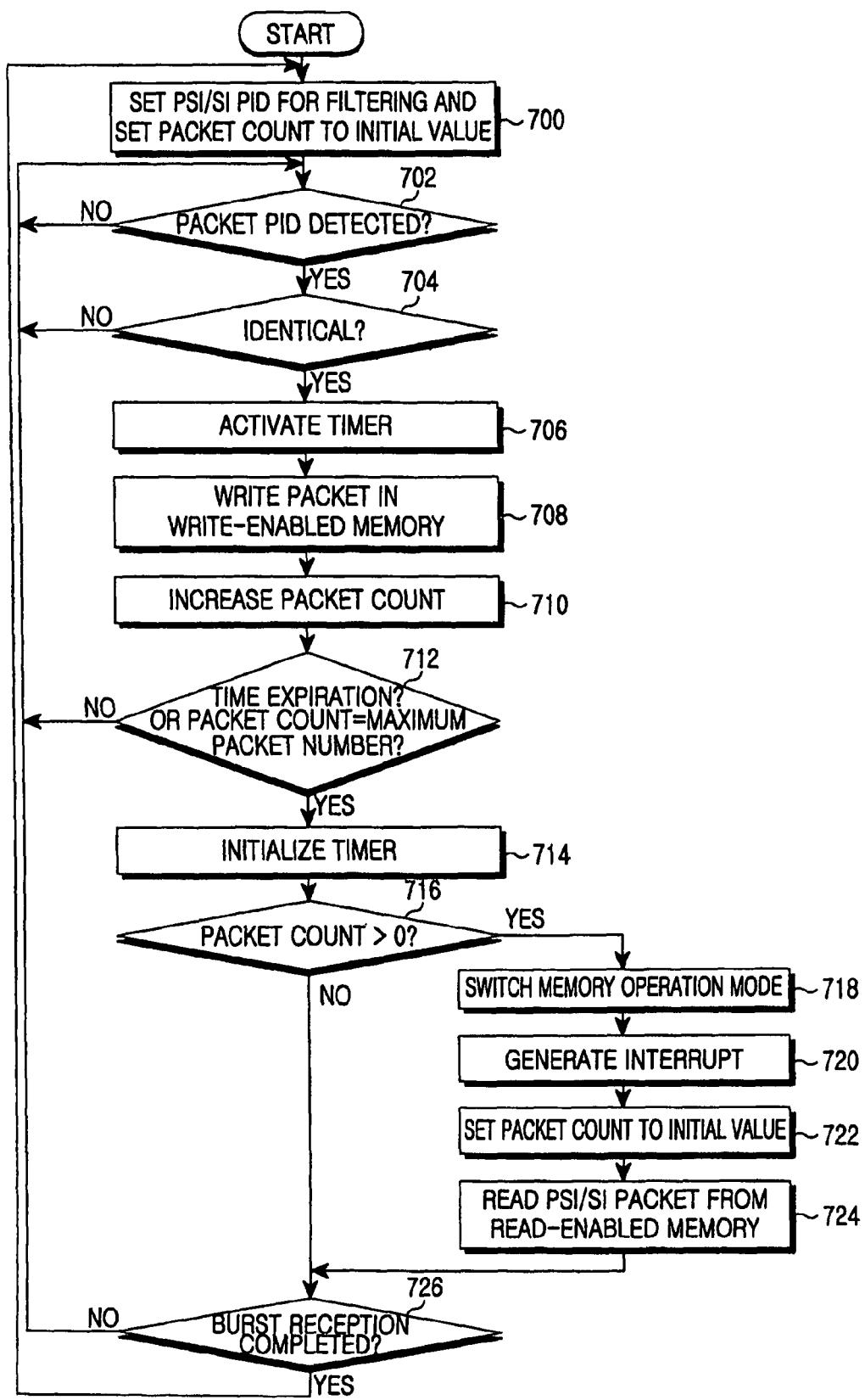
FIG. 7 is a flowchart illustrating an operation for receiving PSI/SI packets in the DVB-H receiver according to another exemplary embodiment of the present invention.

FIG. 7 is a flowchart illustrating an operation for receiving PSI/SI packets in the DVB-H receiver according to another exemplary embodiment of the present invention.

Referring to FIG. 7, the controller 302 sets an intended PSI/SI PID for filtering and sets a packet count to an initial value in step 700. If the PID filter 306 detects a packet PID, i.e. if it detects a TS packet carrying PSI/SI in step 702, it compares the PID of the received packet with the controller-set PID in step 704. If the PIDs are identical, the PID filter 306 activates the timer 300 in step 706 and writes PSI/SI packet data of the TS packet in a write-enabled memory in step 708. In step 710, the packet counter 308 increases the packet count.

If the time count of the timer 300 reaches a predetermined timer value or the packet count of the packet counter 306 is equal to a predetermined maximum packet number in step 712, the interrupt generator 304 initializes the timer 300 in step 714 and determines whether the packet count is greater than 0 in step 716.

If the packet count is greater than 0, the interrupt generator 304 controls the memory controller 310 to switch the operations modes of the memories 212 and 214 (read to write and write to read) in step 718. Thus, a memory engaged in writing is read-enabled, and the other memory engaged in reading is write-enabled.

The interrupt generator 304 provides an interrupt signal to the controller 302 in step 720 and sets the packet count to the initial value in step 722. In step 724, the controller 302 reads filtered PSI/SI packet data from the read-enabled memory.

Alternatively, if the packet count is 0 in step 716, the controller 302 determines whether burst reception has been completed in step 726. If the burst reception is in progress, the procedure returns to step 702 and the above operation is repeated. If the burst reception has been completed, the controller 302 sets a PID value for the PID filter 306 and sets the packet count to the initial value in step 700.

If the burst reception is still in progress even during the controller's reading PSI/SI packet data from a memory in step 726, the PID filter 306 determines whether a new packet has been received. In the presence of PSI/SI packet data to be filtered, i.e. if a packet carrying PSI/SI exists among successively received TS packets and needs to be stored in a memory, the PID filter 306 controls the memory controller 310 such that the PSI/SI packet can be written in the other write-enabled memory.

In accordance with the first exemplary embodiment of the present invention, the two memories alternate between writing and reading every predetermined period such that received PSI/SI packet data is sent to the host. In accordance with the second exemplary embodiment of the present invention, each time a predetermined number of PSI/SI packets are written, an interrupt signal is provided to the controller. If no more PSI/SI packet data have been received for a predetermined time using a timer, even less stored PSI/SI packets than the predetermined number are output to the controller. Commonly in the two exemplary embodiments, the controller reads designated PSI/SI packets only.

As is apparent from the above description, in accordance with the present invention, a DVB-H receiver selects only controller-set PSI/SI packet data. When a controller reads the selected PSI/SI packet data, it controls the number of packets to be read and a reading duration according to its processing capacity. Therefore, PSI/SI packet data processing is optimized according to the processing capacity of the controller, excess memory use resulting from storing unnecessary PSI/SI packet data is prevented, and thus power is saved in the DVB-H receiver.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for receiving broadcasting service information in a digital broadcasting system, comprising:
   detecting packets carrying broadcasting service information from Transport Stream (TS) packets received over a wireless network, the broadcasting service information being Program Specific Information/Service Information (PSI/SI);
   counting the number of the detected PSI/SI packets;
   storing the detected PSI/SI packets;
   generating an interrupt signal for reading the PSI/SI packets, if the packet count number reaches a predetermined packet number;
   reading the PSI/SI packets after generating the interrupt signal;
   activating a timer when a PSI/SI packet is detected;
   comparing the packet count number with 0, if the timer has counted a predetermined timer value; and
   reading the PSI/SI packets if the packet count number is greater than 0.

2. The method of claim 1, wherein the interrupt signal is generated for reading the PSI/SI packets, if the packet count number is greater than 0.

3. The method of claim 2, wherein the PSI/SI packets are read, if the packet count number is equal to the predetermined packet number.

4. The method of claim 3, further comprising setting the packet count number to an initial value, if the PSI/SI packets are read.

5. The method of claim 1, further comprising alternately writing and reading the PSI/SI packets.

6. An apparatus for receiving broadcasting service information in a digital broadcasting system, comprising:
   a Packet Identifier (PID) filter for detecting packets carrying broadcasting service information with a PID identical to a preset PID from received Transport Stream (TS) packets, the broadcasting service information being Program Specific Information/Service Information (PSI/SI);
   a packet counter for counting the number of the detected PSI/SI packets;
   a memory for storing the detected PSI/SI packets;
   an interrupt generator for providing an interrupt signal for reading the PSI/SI packets, if the packet count number reaches a predetermined packet number;
   a controller for setting the PID for filtering regarding the TS packets, and reading the PSI/SI packets, if the interrupt signal is received from the interrupt generator; and
   a timer for starting to count when a PSI/IS packet is detected,
   wherein if the timer has counted a predetermined timer value, the controller compares the packet count number with 0 and reads the PSI/SI packets if the packet count number is greater than 0.

7. The apparatus of claim 6, wherein the interrupt generator generates the interrupt signal for reading the PSI/SI packets, if the packet count number is greater than 0.

* * * * *